(12) United States Patent  
Leijon et al.

(10) Patent No.: US 6,376,775 B1  
(45) Date of Patent: *Apr. 23, 2002

(54) CONDUCTOR FOR HIGH-VOLTAGE WINDINGS AND A ROTATING ELECTRIC MACHINE COMPRISING A WINDING INCLUDING THE CONDUCTOR

(75) Inventors: Mats Leijon, Vasteras; Kenneth Johannesson, Lyckeby; Stefan Milton, Ramdala; Peter Carstensen, Huddinge; Bengt Rydholm, Vasteras, all of (SE)

(73) Assignee: ABB AB (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 66 days.

(21) Appl. No.: 09/147,319

(22) PCT Filed: May 27, 1997

(86) PCT No.: PCT/SE97/00902

§ 371 Date: Feb. 9, 1999

§ 102(e) Date: Feb. 9, 1999

(87) PCT Pub. No.: WO97/45930

PCT Pub. Date: Dec. 4, 1997

(30) Foreign Application Priority Data

May 29, 1996 (SE) ................................. 9602079  
May 29, 1996 (SE) ................................. 9602093

(51) Int. Cl.[7] ................................. H01B 5/08

(52) U.S. Cl. ................................. 174/128.1

(58) Field of Search .................... 174/113 R, 105 R, 174/106 R, 105 SC, 106 SC, 120 SC, 126.1, 126.2, 128.1, 128.2, 110 A, DIG. 14–DIG. 33, 127

(56) References Cited

U.S. PATENT DOCUMENTS

| | | |
|---|---|---|
| 681,800 A | 9/1901 | Lasche |
| 847,008 A | 3/1907 | Kitsee |
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |

(List continued on next page.)

FOREIGN PATENT DOCUMENTS

| | | |
|---|---|---|
| AT | 399790 | 7/1995 |
| BE | 565063 | 2/1957 |

(List continued on next page.)

OTHER PUBLICATIONS

Shipboard Electrical Insulation; G. L. Moses, 1951, pp. 2&3.  
ABB Elkrafthandbok; ABB AB; 1988; pp. 274–276.

(List continued on next page.)

*Primary Examiner*—Chau N. Nguyen (57) ABSTRACT

A conductor and a rotating electric high-voltage machine that includes the conductor has a cable configured for high-voltage operation. The cable may be included as a winding for the rotating electric high-voltage machine. The conductor includes a first strand that is clad with an electrically insulating layer, and a second strand that is uninsulated whereas the first strand and the second strand are arranged in two or more layers of strands. The two or more layers of strands are insulated from one another. Furthermore, the first and second layers of the two or more layers of strands are arranged around a central core where the central core is at least one of an air core and a core of another material. The second strand is positioned so as not to be electrically contacting any other uninsulated strand.

21 Claims, 2 Drawing Sheets

U.S. PATENT DOCUMENTS

| | | |
|---|---|---|
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A * | 11/1970 | Aupoix et al. ....... 174/105 R X |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A * | 10/1972 | Hansen et al. .............. 174/115 |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A * | 11/1976 | Snow et al. ................... 174/69 |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |

| | | | | | |
|---|---|---|---|---|---|
| 4,274,027 A | 6/1981 | Higuchi et al. | 4,633,109 A | 12/1986 | Feigel |
| 4,281,264 A | 7/1981 | Keim et al. | 4,650,924 A | 3/1987 | Kauffman et al. |
| 4,292,558 A | 9/1981 | Flick et al. | 4,652,963 A | 3/1987 | Fahlen |
| 4,307,311 A | 12/1981 | Grozinger | 4,656,316 A | 4/1987 | Meltsch |
| 4,308,476 A | 12/1981 | Schuler | 4,656,379 A | 4/1987 | McCarty |
| 4,308,575 A | 12/1981 | Mase | 4,677,328 A | 6/1987 | Kumakura |
| 4,310,966 A | 1/1982 | Brietenbach | 4,687,882 A | 8/1987 | Stone et al. |
| 4,314,168 A | 2/1982 | Breitenbach | 4,692,731 A | 9/1987 | Osinga |
| 4,317,001 A | 2/1982 | Silver et al. | 4,723,083 A | 2/1988 | Elton |
| 4,320,645 A | 3/1982 | Stanley | 4,723,104 A | 2/1988 | Rohatyn |
| 4,321,426 A | 3/1982 | Schaeffer | 4,724,345 A | 2/1988 | Elton et al. |
| 4,321,518 A | 3/1982 | Akamatsu | 4,732,412 A | 3/1988 | van der Linden et al. |
| 4,330,726 A | 5/1982 | Albright et al. | 4,737,704 A | 4/1988 | Kalinnikov et al. |
| 4,337,922 A | 7/1982 | Streiff et al. | 4,745,314 A | 5/1988 | Nakano |
| 4,341,989 A | 7/1982 | Sandberg et al. | 4,761,602 A | 8/1988 | Leibovich |
| 4,347,449 A | 8/1982 | Beau | 4,766,365 A | 8/1988 | Bolduc et al. |
| 4,347,454 A | 8/1982 | Gellert et al. | 4,771,168 A | 9/1988 | Gundersen et al. |
| 4,353,612 A | 10/1982 | Meyers | 4,785,138 A * | 11/1988 | Breitenbach et al. . 174/106 SC |
| 4,357,542 A | 11/1982 | Kirschbaum | 4,795,933 A | 1/1989 | Sakai |
| 4,360,748 A | 11/1982 | Raschbichler et al. | 4,827,172 A | 5/1989 | Kobayashi |
| 4,361,723 A | 11/1982 | Hvizd, Jr. et al. | 4,845,308 A | 7/1989 | Womack, Jr. et al. |
| 4,365,178 A | 12/1982 | Lexz | 4,847,747 A | 7/1989 | Abbondanti |
| 4,367,425 A | 1/1983 | Mendelsohn et al. | 4,853,565 A | 8/1989 | Elton et al. |
| 4,367,890 A | 1/1983 | Spirk | 4,859,810 A | 8/1989 | Cloetens et al. |
| 4,368,418 A | 1/1983 | Demello et al. | 4,859,989 A | 8/1989 | McPherson |
| 4,369,389 A | 1/1983 | Lambrecht | 4,860,430 A | 8/1989 | Raschbichler et al. |
| 4,371,745 A | 2/1983 | Sakashita | 4,864,266 A | 9/1989 | Feather et al. |
| 4,384,944 A | 5/1983 | Silver et al. | 4,883,230 A | 11/1989 | Lindstrom |
| 4,387,316 A | 6/1983 | Katsekas | 4,890,040 A | 12/1989 | Gunderson |
| 4,401,920 A | 8/1983 | Taylor et al. | 4,894,284 A | 1/1990 | Yamanouchi et al. |
| 4,403,163 A | 9/1983 | Rarmerding et al. | 4,914,386 A | 4/1990 | Zocholl |
| 4,404,486 A | 9/1983 | Keim et al. | 4,918,347 A | 4/1990 | Takaba |
| 4,411,710 A | 10/1983 | Mochizuki et al. | 4,918,835 A | 4/1990 | Wcislo et al. |
| 4,421,284 A | 12/1983 | Pan | 4,924,342 A | 5/1990 | Lee |
| 4,425,521 A | 1/1984 | Rosenberry, Jr. et al. | 4,926,079 A | 5/1990 | Niemela et al. |
| 4,426,771 A | 1/1984 | Wang et al. | 4,942,326 A | 7/1990 | Butler, III et al. |
| 4,429,244 A | 1/1984 | Nikiten et al. | 4,949,001 A | 8/1990 | Campbell |
| 4,431,960 A | 2/1984 | Zucker | 4,982,147 A | 1/1991 | Lauw |
| 4,432,029 A | 2/1984 | Lundqvist | 4,994,952 A | 2/1991 | Silva et al. |
| 4,437,464 A | 3/1984 | Crow | 4,997,995 A * | 3/1991 | Simmons et al. ..... 174/120 SC |
| 4,443,725 A | 4/1984 | Derderian et al. | 5,012,125 A | 4/1991 | Conway |
| 4,470,884 A | 9/1984 | Carr | 5,030,813 A | 7/1991 | Stanisz |
| 4,473,765 A | 9/1984 | Butman, Jr. et al. | 5,036,165 A | 7/1991 | Elton et al. |
| 4,475,075 A | 10/1984 | Munn | 5,036,238 A | 7/1991 | Tajima |
| 4,477,690 A | 10/1984 | Nikitin et al. | 5,066,881 A * | 11/1991 | Elton et al. ........ 174/106 SC X |
| 4,481,438 A | 11/1984 | Keim | 5,067,046 A | 11/1991 | Elton et al. |
| 4,484,106 A | 11/1984 | Taylor et al. | 5,083,360 A | 1/1992 | Valencic et al. |
| 4,488,079 A | 12/1984 | Dailey et al. | 5,086,246 A | 2/1992 | Dymond et al. |
| 4,490,651 A | 12/1984 | Taylor et al. | 5,091,609 A * | 2/1992 | Sawada et al. .......... 174/110 A |
| 4,503,284 A | 3/1985 | Minnick et al. | 5,094,703 A | 3/1992 | Takaoka et al. |
| 4,508,251 A | 4/1985 | Harada et al. | 5,095,175 A * | 3/1992 | Yoshida et al. ...... 174/128.1 X |
| 4,510,077 A | 4/1985 | Elton | 5,097,241 A | 3/1992 | Smith et al. |
| 4,517,471 A | 5/1985 | Sachs | 5,097,591 A | 3/1992 | Wcislo et al. |
| 4,520,287 A | 5/1985 | Wang et al. | 5,111,095 A | 5/1992 | Hendershot |
| 4,523,249 A | 6/1985 | Arimoto | 5,124,607 A | 6/1992 | Rieber et al. |
| 4,538,131 A | 8/1985 | Baier et al. | 5,136,459 A | 8/1992 | Fararooy |
| 4,546,210 A | 10/1985 | Akiba et al. | 5,140,290 A | 8/1992 | Dersch |
| 4,551,780 A | 11/1985 | Canay | 5,153,460 A | 10/1992 | Bovino et al. |
| 4,557,038 A | 12/1985 | Wcislo et al. | 5,168,662 A | 12/1992 | Nakamura et al. |
| 4,560,896 A | 12/1985 | Vogt et al. | 5,171,941 A * | 12/1992 | Shimizu et al. ...... 174/128.1 X |
| 4,565,929 A | 1/1986 | Baskin et al. | 5,182,537 A | 1/1993 | Thuis |
| 4,571,453 A * | 2/1986 | Takaoka et al. ..... 174/126.1 X | 5,187,428 A | 2/1993 | Hutchison et al. |
| 4,588,916 A | 5/1986 | Lis | 5,231,249 A | 7/1993 | Kimura et al. |
| 4,590,416 A | 5/1986 | Porche et al. | 5,235,488 A | 8/1993 | Koch |
| 4,594,630 A | 6/1986 | Rabinowitz et al. | 5,246,783 A | 9/1993 | Spenadel et al. |
| 4,607,183 A | 8/1986 | Rieber et al. | 5,264,778 A | 11/1993 | Kimmel et al. |
| 4,615,109 A | 10/1986 | Wcislo et al. | 5,287,262 A | 2/1994 | Klein |
| 4,615,778 A | 10/1986 | Elton | 5,304,883 A | 4/1994 | Denk |
| 4,618,795 A | 10/1986 | Cooper et al. | 5,305,961 A | 4/1994 | Errard et al. |
| 4,619,040 A | 10/1986 | Wang et al. | 5,321,308 A | 6/1994 | Johncock |
| 4,622,116 A | 11/1986 | Elton et al. | 5,323,330 A | 6/1994 | Asplund et al. |

| | | | | | | |
|---|---|---|---|---|---|---|
| 5,325,008 A | 6/1994 | Grant | | DE | 1807391 | 5/1970 |
| 5,325,259 A | 6/1994 | Paulsson | | DE | 2050674 | 5/1971 |
| 5,327,637 A | 7/1994 | Britenbach et al. | | DE | 1638176 | 6/1971 |
| 5,341,281 A | 8/1994 | Skibinski | | DE | 2155371 | 5/1973 |
| 5,343,139 A | 8/1994 | Gyugyi et al. | | DE | 2400698 | 7/1975 |
| 5,355,046 A | 10/1994 | Weigelt | | DE | 2520511 | 11/1976 |
| 5,365,132 A | 11/1994 | Hann et al. | | DE | 2656389 | 6/1978 |
| 5,387,890 A | 2/1995 | Estop et al. | | DE | 2721905 | 11/1978 |
| 5,397,513 A | 3/1995 | Steketee, Jr. | | DE | 137164 | 8/1979 |
| 5,399,941 A | 3/1995 | Grothaus et al. | | DE | 138840 | 11/1979 |
| 5,400,005 A | 3/1995 | Bobry | | DE | 2824951 | 12/1979 |
| 5,408,169 A | 4/1995 | Jeanneret | | DE | 2835386 | 2/1980 |
| 5,449,861 A * | 9/1995 | Fujimoto et al. ........ 174/128.1 | | DE | 2839517 | 3/1980 |
| 5,452,170 A | 9/1995 | Ohde et al. | | DE | 2854520 | 6/1980 |
| 5,468,916 A | 11/1995 | Litenas et al. | | DE | 3009102 | 9/1980 |
| 5,499,178 A | 3/1996 | Mohan | | DE | 2913697 | 10/1980 |
| 5,500,632 A | 3/1996 | Halser, III | | DE | 2920478 | 12/1980 |
| 5,510,942 A | 4/1996 | Bock et al. | | DE | 3028777 | 3/1981 |
| 5,530,307 A | 6/1996 | Horst | | DE | 2939004 | 4/1981 |
| 5,533,658 A | 7/1996 | Benedict et al. | | DE | 3006382 | 8/1981 |
| 5,534,754 A | 7/1996 | Poumey | | DE | 3008818 | 9/1981 |
| 5,545,853 A | 8/1996 | Hildreth | | DE | 209313 | 4/1984 |
| 5,550,410 A | 8/1996 | Titus | | DE | 3305225 | 8/1984 |
| 5,583,387 A | 12/1996 | Takeuchi et al. | | DE | 3309051 | 9/1984 |
| 5,587,126 A | 12/1996 | Steketee, Jr. | | DE | 3441311 | 5/1986 |
| 5,598,137 A | 1/1997 | Alber et al. | | DE | 3543106 | 6/1987 |
| 5,607,320 A | 3/1997 | Wright | | DE | 2917717 | 8/1987 |
| 5,612,510 A | 3/1997 | Hildreth | | DE | 3612112 | 10/1987 |
| 5,663,605 A | 9/1997 | Evans et al. | | DE | 3726346 | 2/1989 |
| 5,672,926 A | 9/1997 | Brandes et al. | | DE | 3925337 | 2/1991 |
| 5,689,223 A | 11/1997 | Demarmels et al. | | DE | 4023903 | 11/1991 |
| 5,807,447 A | 9/1998 | Forrest | | DE | 4022476 | 1/1992 |
| 5,834,699 A * | 11/1998 | Buck et al. ............. 174/113 R | | DE | 4233558 | 3/1994 |
| | | | | DE | 4402184 | 8/1995 |
| FOREIGN PATENT DOCUMENTS | | | | DE | 4409794 | 8/1995 |
| CH | 391071 | 4/1965 | | DE | 4412761 | 10/1995 |
| CH | 534448 | 2/1973 | | DE | 4420322 | 12/1995 |
| CH | 539328 | 7/1973 | | DE | 19620906 | 1/1996 |
| CH | 657482 | 8/1986 | | DE | 4438186 | 5/1996 |
| DE | 40414 | 8/1887 | | DE | 19020222 | 3/1997 |
| DE | 134022 | 12/1901 | | DE | 19547229 | 6/1997 |
| DE | 277012 | 7/1914 | | DE | 468827 | 7/1997 |
| DE | 336418 | 6/1920 | | EP | 049104 | 4/1982 |
| DE | 372390 | 3/1923 | | EP | 0493704 | 4/1982 |
| DE | 386561 | 12/1923 | | EP | 0056580 A1 | 7/1982 |
| DE | 387973 | 1/1924 | | EP | 078908 | 5/1983 |
| DE | 406371 | 11/1924 | | EP | 0120154 | 10/1984 |
| DE | 425551 | 2/1926 | | EP | 0130124 | 1/1985 |
| DE | 426793 | 3/1926 | | EP | 0142813 | 5/1985 |
| DE | 432169 | 7/1926 | | EP | 0155405 | 9/1985 |
| DE | 433749 | 9/1926 | | EP | 0102513 | 1/1986 |
| DE | 435608 | 10/1926 | | EP | 0174783 | 3/1986 |
| DE | 435609 | 10/1926 | | EP | 0185788 | 7/1986 |
| DE | 441717 | 3/1927 | | EP | 0277358 | 8/1986 |
| DE | 443011 | 4/1927 | | EP | 0234521 | 9/1987 |
| DE | 460124 | 5/1928 | | EP | 0244069 | 11/1987 |
| DE | 482506 | 9/1929 | | EP | 0246377 | 11/1987 |
| DE | 501181 | 7/1930 | | EP | 0265868 | 5/1988 |
| DE | 523047 | 4/1931 | | EP | 0274691 | 7/1988 |
| DE | 568508 | 1/1933 | | EP | 0280759 | 9/1988 |
| DE | 572030 | 3/1933 | | EP | 0282876 | 9/1988 |
| DE | 584639 | 9/1933 | | EP | 0309096 | 3/1989 |
| DE | 586121 | 10/1933 | | EP | 0314860 | 5/1989 |
| DE | 604972 | 11/1934 | | EP | 0316911 | 5/1989 |
| DE | 629301 | 4/1936 | | EP | 0317248 | 5/1989 |
| DE | 673545 | 3/1939 | | EP | 0335430 | 10/1989 |
| DE | 719009 | 3/1942 | | EP | 0342554 | 11/1989 |
| DE | 846583 | 8/1952 | | EP | 0221404 | 5/1990 |
| DE | 875227 | 4/1953 | | EP | 0375101 | 6/1990 |
| DE | 975999 | 1/1963 | | EP | 0406437 | 1/1991 |
| DE | 1465719 | 5/1969 | | EP | 0439410 | 7/1991 |

| | | | | | | |
|---|---|---|---|---|---|---|
| EP | 0400865 | | 8/1991 | GB | 1147049 | 4/1969 |
| EP | 0469155 | A1 | 2/1992 | GB | 1157885 | 7/1969 |
| EP | 0490705 | | 6/1992 | GB | 1174659 | 12/1969 |
| EP | 0503817 | | 9/1992 | GB | 1236082 | 6/1971 |
| EP | 0571155 | | 11/1993 | GB | 1268770 | 3/1972 |
| EP | 0620570 | | 10/1994 | GB | 1319257 | 6/1973 |
| EP | 0620630 | | 10/1994 | GB | 1322433 | 7/1973 |
| EP | 0642027 | | 3/1995 | GB | 1340983 | 12/1973 |
| EP | 0671632 | | 9/1995 | GB | 1341050 | 12/1973 |
| EP | 0676777 | | 10/1995 | GB | 1365191 | 8/1974 |
| EP | 0677915 | | 10/1995 | GB | 1395152 | 5/1975 |
| EP | 0684679 | | 11/1995 | GB | 1424982 | 2/1976 |
| EP | 0684682 | | 11/1995 | GB | 1426594 | 3/1976 |
| EP | 0695019 | | 1/1996 | GB | 1438610 | 6/1976 |
| EP | 0732787 | | 9/1996 | GB | 1445284 | 8/1976 |
| EP | 0738034 | | 10/1996 | GB | 1479904 | 7/1977 |
| EP | 0739087 | A2 | 10/1996 | GB | 1493163 | 11/1977 |
| EP | 0740315 | | 10/1996 | GB | 1052938 | 3/1978 |
| EP | 0749190 | A2 | 12/1996 | GB | 1525745 | 9/1978 |
| EP | 0751605 | | 1/1997 | GB | 2000625 | 1/1979 |
| EP | 0739087 | A3 | 3/1997 | GB | 1548633 | 7/1979 |
| EP | 0749193 | A3 | 3/1997 | GB | 2046142 | 11/1979 |
| EP | 0780926 | | 6/1997 | GB | 2022327 | 12/1979 |
| EP | 0802542 | | 10/1997 | GB | 2025150 | 1/1980 |
| EP | 0913912 | A1 | 5/1999 | GB | 2034101 | 5/1980 |
| FR | 805544 | | 4/1936 | GB | 1574796 | 9/1980 |
| FR | 841351 | | 1/1938 | GB | 2070341 | 9/1981 |
| FR | 847899 | | 12/1938 | GB | 2070470 | 9/1981 |
| FR | 916959 | | 12/1946 | GB | 2071433 | 9/1981 |
| FR | 1011924 | | 4/1949 | GB | 2081523 | 2/1982 |
| FR | 1126975 | | 3/1955 | GB | 2099635 | 12/1982 |
| FR | 1238795 | | 7/1959 | GB | 2105925 | 3/1983 |
| FR | 2108171 | | 5/1972 | GB | 2106306 | 4/1983 |
| FR | 2251938 | | 6/1975 | GB | 2106721 | 4/1983 |
| FR | 2305879 | | 10/1976 | GB | 2136214 | 9/1984 |
| FR | 2376542 | | 7/1978 | GB | 2140195 | 11/1984 |
| FR | 2467502 | | 4/1981 | GB | 2150153 | 6/1985 |
| FR | 2481531 | | 10/1981 | GB | 2268337 | 1/1994 |
| FR | 2556146 | | 6/1985 | GB | 2273819 | 6/1994 |
| FR | 2594271 | | 8/1987 | GB | 2283133 | 4/1995 |
| FR | 2708157 | | 1/1995 | GB | 2289992 | 12/1995 |
| GB | 123906 | | 3/1919 | GB | 2308490 | 6/1997 |
| GB | 268271 | | 3/1927 | GB | 2332557 | 6/1999 |
| GB | 293861 | | 11/1928 | HU | 175494 | 11/1981 |
| GB | 292999 | | 4/1929 | JP | 60206121 | 3/1959 |
| GB | 319313 | | 7/1929 | JP | 57043529 | 8/1980 |
| GB | 518993 | | 3/1940 | JP | 57126117 | 5/1982 |
| GB | 537609 | | 6/1941 | JP | 59076156 | 10/1982 |
| GB | 540456 | | 10/1941 | JP | 59159642 | 2/1983 |
| GB | 589071 | | 6/1947 | JP | 6264964 | 9/1985 |
| GB | 666883 | | 2/1952 | JP | 1129737 | 5/1989 |
| GB | 685416 | | 1/1953 | JP | 62320631 | 6/1989 |
| GB | 702892 | | 1/1954 | JP | 2017474 | 1/1990 |
| GB | 715226 | | 9/1954 | JP | 3245748 | 2/1990 |
| GB | 723457 | | 2/1955 | JP | 4179107 | 11/1990 |
| GB | 739962 | | 11/1955 | JP | 318253 | 1/1991 |
| GB | 763761 | | 12/1956 | JP | 424909 | 1/1992 |
| GB | 805721 | | 12/1958 | JP | 5290947 | 4/1992 |
| GB | 827600 | | 2/1960 | JP | 6196343 | 12/1992 |
| GB | 854728 | | 11/1960 | JP | 6233442 | 2/1993 |
| GB | 870583 | | 6/1961 | JP | 6325629 | 5/1993 |
| GB | 913386 | | 12/1962 | JP | 7057951 | 8/1993 |
| GB | 965741 | | 8/1964 | JP | 7264789 | 3/1994 |
| GB | 992249 | | 5/1965 | JP | 8167332 | 12/1994 |
| GB | 1024583 | | 3/1966 | JP | 7161270 | 6/1995 |
| GB | 1053337 | | 12/1966 | JP | 8264039 | 11/1995 |
| GB | 1059123 | | 2/1967 | JP | 9200989 | 1/1996 |
| GB | 1103098 | | 2/1968 | JP | 8036952 | 2/1996 |
| GB | 1103099 | | 2/1968 | JP | 8167360 | 6/1996 |
| GB | 1117401 | | 6/1968 | LU | 67199 | 3/1972 |
| GB | 1135242 | | 12/1968 | SE | 90308 | 9/1937 |

| | | | | | | |
|---|---|---|---|---|---|---|
| SE | 305899 | 11/1968 | | WO | WO9745937 | 12/1997 |
| SE | 255156 | 2/1969 | | WO | WO9745938 | 12/1997 |
| SE | 341428 | 12/1971 | | WO | WO9745939 | 12/1997 |
| SE | 453236 | 1/1982 | | WO | WO9747067 | 12/1997 |
| SE | 457792 | 6/1987 | | WO | WO9820595 | 5/1998 |
| SE | 502417 | 12/1993 | | WO | WO9820596 | 5/1998 |
| SU | 266037 | 10/1965 | | WO | WO9820597 | 5/1998 |
| SU | 792302 | 1/1971 | | WO | WO 98/20598 | 5/1998 |
| SU | 425268 | 9/1974 | | WO | WO9820600 | 5/1998 |
| SU | 646403 | 2/1979 | | WO | WO 98/20602 | 5/1998 |
| SU | 1019553 | 1/1980 | | WO | WO9821385 | 5/1998 |
| SU | 694939 | 1/1982 | | WO | PCT/FR 98/00468 | 6/1998 |
| SU | 955369 | 8/1983 | | WO | WO9827634 | 6/1998 |
| SU | 1189322 | 10/1986 | | WO | WO9827635 | 6/1998 |
| SU | 1511810 | 5/1987 | | WO | WO9827636 | 6/1998 |
| WO | WO8202617 | 8/1982 | | WO | WO9829927 | 7/1998 |
| WO | WO8502302 | 5/1985 | | WO | WO9829928 | 7/1998 |
| WO | WO9011389 | 10/1990 | | WO | WO9829929 | 7/1998 |
| WO | WO9012409 | 10/1990 | | WO | WO9829930 | 7/1998 |
| WO | PCT/DE 90/00279 | 11/1990 | | WO | WO9829931 | 7/1998 |
| WO | WO9101059 | 1/1991 | | WO | WO9829932 | 7/1998 |
| WO | WO9101585 | 2/1991 | | WO | WO9833731 | 8/1998 |
| WO | WO9107807 | 3/1991 | | WO | WO9833736 | 8/1998 |
| WO | PCT SE 91/00077 | 4/1991 | | WO | WO9833737 | 8/1998 |
| WO | WO9109442 | 6/1991 | | WO | WO9834238 | 8/1998 |
| WO | WO 91/11841 | 8/1991 | | WO | WO 98/34239 | 8/1998 |
| WO | WO8115862 | 10/1991 | | WO | WO9834240 | 8/1998 |
| WO | WO 91/15755 | 10/1991 | | WO | WO9834241 | 8/1998 |
| WO | WO9201328 | 1/1992 | | WO | WO9834242 | 8/1998 |
| WO | WO9203870 | 3/1992 | | WO | WO9834243 | 8/1998 |
| WO | WO9321681 | 10/1993 | | WO | WO9834244 | 8/1998 |
| WO | WO9406194 | 3/1994 | | WO | WO9834245 | 8/1998 |
| WO | WO9518058 | 7/1995 | | WO | WO9834246 | 8/1998 |
| WO | WO9522153 | 8/1995 | | WO | WO9834247 | 8/1998 |
| WO | WO9524049 | 9/1995 | | WO | WO9834248 | 8/1998 |
| WO | WO9622606 | 7/1996 | | WO | WO9834249 | 8/1998 |
| WO | WO9622607 | 7/1996 | | WO | WO9834250 | 8/1998 |
| WO | PCT/CN 96/00010 | 10/1996 | | WO | WO9834309 | 8/1998 |
| WO | WO9630144 | 10/1996 | | WO | WO9834312 | 8/1998 |
| WO | WO9710640 | 3/1997 | | WO | WO9834315 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO9745288 | 12/1997 | | WO | WO9834325 | 8/1998 |
| WO | WO9745847 | 12/1997 | | WO | WO9834326 | 8/1998 |
| WO | WO9745848 | 12/1997 | | WO | WO9834327 | 8/1998 |
| WO | WO9745906 | 12/1997 | | WO | WO9834328 | 8/1998 |
| WO | WO9745907 | 12/1997 | | WO | WO9834329 | 8/1998 |
| WO | WO9745912 | 12/1997 | | WO | WO9834330 | 8/1998 |
| WO | WO9745914 | 12/1997 | | WO | WO9834331 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |
| WO | WO9745930 | 12/1997 | | WO | WO9917428 | 4/1999 |
| WO | WO9745931 | 12/1997 | | WO | WO9917429 | 4/1999 |
| WO | WO9745932 | 12/1997 | | WO | WO9917432 | 4/1999 |
| WO | WO9745933 | 12/1997 | | WO | WO9917433 | 4/1999 |
| WO | WO9745934 | 12/1997 | | WO | WO9919963 | 4/1999 |
| WO | WO9745935 | 12/1997 | | WO | WO9919969 | 4/1999 |
| WO | WO9745936 | 12/1997 | | WO | WO9919970 | 4/1999 |

| | | |
|---|---|---|
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Elkraft teknisk Handbok, 2 Elmaskiner; A. Alfredsson et al; 1988, pp. 121–123.

High Voltage Cables in a New Class of Generators Powerformer; M. Leijon et al; Jun. 14, 1999; pp. 1–8.

Ohne Transformer direkt ins Netz; Owman et al, ABB, AB; Feb. 8, 1999; pp. 48–51.

Submersible Motors and Wet–Rotor Motors for Centrifugal Pumps Submerged in the Fluid Handled; K.. Bienick, KSB; Feb. 25, 1988; pp. 9–17.

High Voltage Generators; G. Beschastnov et al; 1977; vol. 48, No. 6 pp. 1–7.

Eine neue Type von Unterwassermotoren; Electrotechnik und Maschinenbam, 49; Aug. 1931; pp. 2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp. 25–31.

Hydroalternators of 110 to 220 kV Elektrotechn. Obz., vol. 64, No. 3, pp. I32–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 60kV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp. 35–40, 1988.

Zur Entwickling der Taucypumpenmotoren; A. Schanz; KSB, pp. 19–24.

Direct Generation of alternating current at high voltages; R. Parsons; IEEE Journal, vol. 67 #393, Jan. 15, 1929; pp. 1065–1080.

Stopfbachslose Umwalzpumpen—ein wichtiges Element im modernen Kraftwerkbau; H. Holz, KSB 1, pp. 13–19, 1960.

Zur Geschichte der Brown Boveri–Synchron–Maschinen; Vierzig Jahre Generatorbau; Jan.–Feb. 1931 pp. 15–39.

Technik und Andwendung moderner Tauchpumpen; A Heumann; 1987.

High capacity synchronous generator having no tooth stator; V.S. Kildishev et al; No. 1, 1977 pp. 11–16.

Der Asynchronmotor als Antrieb stopfbcichsloser Pumpen; E. Picmaus; Eletrotechnik und Maschinenbay No. 78, pp. 153–155, 1961.

Low core loss rotating flux transformer; R. F. Krause, et al; American Institute Physics J.Appl.Phys vol. 64 #10 Nov. 1988, pp. 5376–5378.

An EHV bulk Power transmission line Made with Low Loss XLPE Cable;Ichihara et al; 8/92; pp. 3–6.

Underground Transmission Systems Reference Book; 1992; pp. 16–19; pp. 36–45; pp. 67–81.

Power System Stability and Control; P. Kundur, 1994; pp. 23–25;p. 767.

Six phase Synchronous Machine with AC and DC Stator Connections, Part II:Harmonic Studies and a proposed Uninterruptible Power Supply Scheme; R. Schiferi et al.;Aug. 1983 pp. 2694–2701.

Six phase Synchronous Machine with AC and DC Stator Connections, Part 1: Equivalent circuit representation and Steady–State Analysis; R. Schiferl et al; Aug. 1983; pp. 2685–2693.

Reactive Power Compensation; T. Petersson; 1993; pp. 1–23.

Permanent Magnet Machines; K. Binns; 1987; pp. 9–1 through 9–26.

Hochspannungsanlagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959, pp. 30–33.

Neue Lbsungswege zum Entwurf gorsser Turbogeneratoren bis 2GVA, 60kV; G. Aicholzer; Sep. 1974, pp. 249–255.

Advanced Turbine–generators—an assessment; A. Appleton, et al; International Conf. Proceedings, Lg HV Elec. Sys. Paris, FR, Aug.–Sep. 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

PowerFormer™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp. 330–334.

Development of extruded polymer insulated superconducting cable; Jan. 1992.

Transformer core losses; B. Richardson; Proc. IEEE May 1986, pp. 365–368.

Cloth–transformer with divided windings and tension annealed amorphous wire; T. Yammamoto et al; IEEE Translation Journal on Magnetics in Japan vol. 4 No. 9 Sep. 1989.

A study of equipment sizes and constraints for a unified power flow controller; J Bian et al; IEEE 1996.

A test installation of a self–tuned ac filter in the Konti–Skan 2HVDC link; T. Homlgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64–70.

Analysis of faulted Power Systems; P Anderson, Iowa State University Press/Ames, Iowa, 1973, pp. 255–257.

36–Kv. Generators Arise from Insulation Research; P. Sidler; *Electrical World* Oct. 15, 1932, pp. 524.

Oil Water cooled 300 MW turbine generator;L.P. Gnedin et al;*Elektrotechnika,* 1970, pp. 6–8.

J&P Transformer Book 11$^{th}$ Edition;A. C. Franklin el al; owned by Butterworth—Heinemann Ltd, Oxford Printed by Hartnolls Ltd in Great Britain 1983, pp. 29–67.

Transformerboard; H.P. Moser et al; 1979, pp. 1–19.

The Skagerrak transmission—the world's longest HVDC submarine cable link; L. Haglof et al of ASEA; ASEA Journal vol. 53, No. 1–2, 1980, pp. 3–12.

Direct Connection of Generators to HVDC Converters: Main Characteristics and Comparative Advantages; J.Arillaga et al; *Electra* No. 149, Aug. 1993, pp. 19–37.

Our flexible friend article; M. Judge; *New Scientist,* May 10, 1997, pp. 44–48.

In–Service Performance of HVDC Converter transformers and oil–cooled smoothing reactors; G.L. Desilets et al; *Electra* No. 155, Aug. 1995; pp. 7–29.

Transformateurs a courant continu haute tension–examen des specifications; A. Lindroth et al; *Electra* No. 141, Apr. 1992, pp. 34–39.

Development of a Termination for the 77 kV–Class High Tc Superconducting Power Cable; T. Shimonosono et al; IEEE Power Delivery, vol. 12, No. 1, Jan. 1997, pp. 33–38.

Verification of Limiter Performance in Modern Excitation Control Systems; G. K. Girgis et al; IEEE Energy Conservation, vol. 10, No. 3, Sep. 1995, pp. 538–542.

A High Initial response Brushless Excitation System; T. L. Dillman et al; IEEE Power Generation Winter Meeting Proceedings, Jan. 31, 1971, pp. 2089–2094.

Design, manufacturing and cold test of a superconducting coil and its cryostat for SMES applications; A. Bautista et al; IEEE Applied Superconductivity, vol. 7, No. 2, Jun. 1997, pp. 853–856.

Quench Protection and Stagnant Normal Zones in a Large Cryostable SMES; Y. Lvovsky et al; IEEE Applied Superconductivity, vol. 7, No. 2, Jun. 1997, pp. 857–860.

Design and Construction of the 4 Tesla Background Coil for the Navy SMES Cable Test Apparatus; D.W.Scherbarth et al; IEEE Applied Superconductivity, vol. 7, No. 2, Jun. 1997, pp. 840–843.

High Speed Synchronous Motors Adjustable Speed Drives; ASEA Generation Pamphlet OG 135–101 E, Jan. 1985, pp. 1–4.

Billig burk motar overtonen; A. Felldin; *ERA* (TEKNIK) Aug. 1994, pp. 26–28.

400–kV XLPE cable system passes CIGRE test; ABB Article; ABB Review Sep. 1995, pp. 38.

FREQSYN—a new drive system for high power applications;J–A. Bergman et al; ASEA Journal 59, Apr. 1986, pp. 16–19.

Canadians Create Conductive Concrete; J. Beaudoin et al; *Science,* vol. 276, May 23, 1997,p. 1201.

Fully Water–Cooled 190 MVA Generators in the Tonstad Hyperelectric Power Station; E. Ostby et al; BBC Review Aug. 1969, pp. 380–385.

Relocatable static var compensators help control unbundled power flows; R. C. Knight et al; *Transmission & Distribution,* Dec. 1996, pp. 49–54.

Investigation and Use of Asynchronized Machines In Power Systems*; N.I.Blotskii et al; *Elektrichestvo,* No. 12, 1–6, 1985, pp. 90–99.

Variable–speed switched reluctance motors; P.J. Lawrenson et al; IEEE proc, vol. 127, Pt.B, No.4, Jul. 1980, pp. 253–265.

Das Einphasenwechselstromsystem hoherer Frequenz; J.G. Heft; Elektrische Bahnen eb; Dec. 1987, pp. 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for Elkreafteknilk, KTH; Stockholm, 1996, pp. 3–6, 3–12.

Die Wechselstromtechnik; A. Cour' Springer Verlag, Germany; 1936, pp. 586–598.

Insulation systems for superconducting transmission cables; O. Toennesen; Nordic Insulation Symposium, Bergen, 1996, pp. 425–432.

MPTC: An economical alternative to universal power flow controllers;N. Mohan; EPE 1997, Trondheim, pp. 3.1027–3.1030.

Lexikon der Technik; Luger; Band 2, Grundlagen der Elektrotechnik und Kerntechnik, 1960, pp. 395.

Das Handbuch der Lokomotiven ( hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp. 267–272.

Elkrafthandboken, Almaskiner; A. Rejminger; Elkrafthandboken, Elmaskiner 1996, 15–20.

Power Electronics—in Theory and Practice; K. Thorborg; ISBN 0–86238–341–2, 1993, pp. 1–13.

Regulating transformers in power systems—new concepts and applications; E. Wirth et al; ABB Review Apr. 1997, pp. 12–20.

Transforming transformers; S. Mehta et al; *IEEE Spectrum,* Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp. 91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;unknown author; International Electrotechnical Vocabulary Chapter 551; Power Electronics Bureau Central de la Commission Electrotechnique Internationale, Geneve; 1982, pp. 1–65.

Design and manufacture of a large superconducting homopolar motor; A.D. Appleton; IEEE Transactions on Magnetics, vol. 19,No. 3, Part 2, May 1983, pp. 1048–1050.

Application of high temperature superconductivy to electric motor design; J.S. Edmonds et al; IEEE Transactions on Energy Conversion Jun. 1992, No. 2, pp. 322–329.

Power Electronics and Variable Frequency Drives; B. Bimal; IEEE Industrial Electronics—Technology and Applications, 1996, p. 356.

Properties of High Plymer Cement Mortar; M. Tamai et al; *Science & Technology in Japan,* No. 63; 1977, pp. 6–14.

Weatherability of Polymer–Modified Mortars after Ten--Year Outdoor Exposure in Koriyama and Sapporo; Y. Ohama et al; *Science & Technology* in Japan No. 63; 1977, pp. 26–31.

SMC Powders Open New Magnetic Applications; M. Persson (Editor); *SMC Update,* vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, pp. 1882–1888.

Low–intensy laser–triggering of rail–gaps with magnesium–aerosol switching–gases; W. Frey; 11th International Pulse Power Conference, 1997, Baltimore, USA Digest of Technical Papers, pp. 322–327.

* cited by examiner-

Fig. 4

CONDUCTOR FOR HIGH-VOLTAGE WINDINGS AND A ROTATING ELECTRIC MACHINE COMPRISING A WINDING INCLUDING THE CONDUCTOR

BACKGROUND OF THE INVENTION

1. Field of the Invention

The present invention relates to conductors for high-voltage windings, preferably for high-voltage windings of a stator in a high-voltage generator, which conductors are stranded with two or more layers of strands electrically insulated from each other, around a central core, which core may be one of the strands of the conductor, air or other material.

The invention also relates to rotating electric machine of the type described herein.

The rotating electrical machines referred to in this context are e.g. synchronous machines, but also double-fed machines, applications in asynchronous static current converter cascades, outerpole machines and synchronous flux machines as well as alternating current machines intended primarily as generators in a power station for generating electric power.

Magnetic circuits referred to in this context, include a magnetic core of laminated, non-oriented or oriented, sheet or other material, for example amorphous or powder-based, or any other arrangement for the purpose of allowing an alternating magnetic flux, a winding, a cooling system, etc., and which may be arranged in the stator of the machine, in the rotor or in both.

2. Discussion of the Background

The stator winding in known generators traditionally consists of an electric conductor having a number of insulated rectangular wires, also known as strands, of copper, aluminium or other suitable metal. These strands are transposed (i.e. change place with each other) and are surrounded by a common insulation in such a way that the bundle of conductors acquires a rectangular cross section. The copper conductors are rectangular in order to reduce the eddy-current losses accomplished by keeping (the linear dimension in the direction of the magnetic field small). However, a conductor with rectangular cross section in a high-voltage insulation (i.e. in a conductor) has the disadvantage in that it provides a much greater field strength at the corners of the conductor, the corners thus becoming dimensioning for the thickness of the insulation. Therefore, from the point of view of optimal insulation thickness, circular conductors would be preferable.

Circular conductors can be constructed in a great number of different ways. The conductor may, for instance, consist of the following:

1) a solid rod of copper or other metal with circular cross section,
2) a conductor stranded from circular wires having the same or different diameters,
3) a conductor stranded from sectioned wires or,
4) a conductor compressed from a number of segments, each of which is in turn stranded from circular wires and then formed into a segment.

In order to reduce the conductor dimension it is sometimes compressed or compacted after stranding, thereby altering the shape of the strands in the outermost layer or in the whole conductor, which may costitute a disadvantage.

To ensure high energy transfer in voltage-transmission lines with a conductor for a given voltage, the current must be increased, which is only possible if the conductor area is increased. When the current becomes large this entails the drawback that the current distribution in the conductor becomes uneven (the current endeavours to reach the outer surface of the conductor) and what is known as a "skin effect", current pinch effect, is obtained. To counteract this effect, conductors, according to prior art, having a large cross section (>1200 $mm^2$ Cu) are produced, usually called Millikan conductors, i.e. conductors built up of a number of concentrically arranged wires which have subsequently been compressed and shaped. Such a conductor is often composed of 5 or 7 segments which are in turn insulated from each other. Such a construction is effective in reducing the current pinch effect in transmission and distribution cables for high-voltage.

It is previously known that, in distribution systems for high-voltage power transmission, all the strands in the cable have been insulated with varnish, for instance, in order to reduce the current pinch effect, see the publication Hitachi Cable Review, No. 11, August 1992, pages 3–6: "An EHV Bulk Power Transmission Line Made with Low Loss XLPE Cable". This publication also describes how a few of the strands in the outermost layer are left uninsulated in order to prevent differences in potential between the wire strands and the inner semi-conductor layer. No application of this technology on generator windings, however, is described.

With generators having conventionally designed stator windings as described above, the upper limit for generated voltage has been deemed to be 30 kV. This usually means that a generator must be connected to the power network via a transformer which steps up the voltage to the level of the power network, —in the range of 130–400 kV.

During the last decades, there have been increasing demands for rotating electric machines for higher voltages than what has previously been possible to design. The maximum voltage level which, according to the state of the art, has been possible to achieve for synchronous machines with a good yield in the coil production is around 25–30 kV. It is also commonly known that the connection of a synchronous machine/generator to a power network must take place via a Δ/Y-connected so-called step-up transformer, since the voltage of the power network normally lies at a higher level than the voltage of the rotating electric machine. Thus, this transformer, and the synchronous machine, constitute integral parts of an installation. The transformer constitutes an extra cost and also has the disadvantage that the total efficiency of the system is reduced. If it were possible to manufacture machines for considerably higher voltages, the step-up transformer could thus be omitted.

Attempts to develop the generator for higher voltages have, however, been in progress for a long time. This is clear, for instance from "Electrical World", Oct. 15, 1932, pages 524–525, which describes how a generator designed by Parson in 1929 was arranged for 33 kV. It also describes a generator in Langerbrugge, Belgium, which produced a voltage of 36 kV. Although the article also speculates on the possibility of increasing voltage levels still further, the development was curtailed by the concepts upon which these generators were based. This was primarily because of the shortcomings of the insulation system where varnish-impregnated layers of mica oil and paper were used in several separate layers.

Certain attempts to find a new approach as regards the design of synchronous machines are described, inter alia, in an article entitled "Water-and-oil-cooled Turbogenerator TVM-300" in J. Elektrotechnika, No. 1, 1970, pp. 6–8, in U.S. Pat. No. 4,429,244 "Stator of Generator" and in Russian patent document CCCP Patent 955369.

The water- and oil-cooled synchronous machine described in J. Elektrotechnika is intended for voltages up to 20 kV. The article describes a new insulation system consisting of oil/paper insulation, which makes it possible to immerse the stator completely in oil. The oil can then be used as a coolant while at the same time using it as insulation. To prevent oil in the stator from leaking out towards the rotor, a dielectric oil-separating ring is provided at the internal surface of the core. The stator winding is made from conductors with an oval hollow shape provided with oil and paper insulation. The coil sides with their insulation are secured to the slots, made with rectangular cross section, by way of wedges. As coolant, oil is used both in the hollow conductors and in holes in the stator walls. Such cooling systems, however, entail a large number of connections for both oil and electricity at the coil ends. The thick insulation also entails an increased radius of curvature of the conductors, which in turn results in an increased size of the winding overhang.

The above-mentioned U.S. patent relates to the stator part of a synchronous machine which comprises a magnetic core of laminated sheet with trapezoidal slots for the stator winding. The slots are tapered since the need of insulation of the stator winding is smaller towards the interior of the rotor where that part of the winding which is located nearest the neutral point is disposed. In addition, the stator part comprises a dielectric oil-separating cylinder or ring nearest the inner surface of the core which may increase the magnetization requirement relative to a machine without this ring. The stator winding is made of oil-immersed cables with the same diameter for each coil layer. The layers are separated from each other by way of spacers in the slots and secured by wedges. What is special for the winding is that it comprises two so-called half-windings connected in series. One of the two half-windings is disposed, centered, inside an insulation sleeve. The conductors of the stator winding are cooled by surrounding oil. The disadvantage with such a large quantity of oil in the system is the risk of leakage and the considerable amount of cleaning work which may result from a fault condition. Those parts of the insulation sleeve which are located outside the slots have a cylindrical part and a conical termination reinforced with current-carrying layers, the purpose of which is to control the electric field strength in the region where the cable enters the end winding.

From CCCP 955369 it is clear, in another attempt to raise the rated voltage of the synchronous machine, that the oil-cooled stator winding comprises a conventional insulated conductor for medium voltage with the same dimension for all the layers. The conductor is placed in stator slots formed as circular, radially disposed openings corresponding to the cross-section area of the cable and with the necessary space for fixation and for coolant. The different radially disposed layers of the winding are surrounded by and fixed in insulated tubes. Insulating spacers fix the tubes in the stator slot. Because of the oil cooling, an internal dielectric ring is also needed here for sealing the coolant against the internal air gap. The design shown has no tapering of the insulation or of the stator slots. The design exhibits a very narrow radial waist between the different stator slots, which means a large slot leakage flux which significantly influences the magnetization requirement of the machine.

In a report from the Electric Power Research Institute, EPRI, EL-3391 from April 1984, an account is given of generator concepts for achieving higher voltage in an electric generator with the object being to connect such a generator to a power network without intermediate transformers. Such a solution is assessed in the report to offer good gains in efficiency and considerable financial advantages. The main reason that it was deemed possible in 1984 to start developing generators for direct connection to power networks was that a super-conducting rotor had been developed at that time. The considerable excitation capacity of the super-conducting field enables the use of an airgap-winding with sufficient thickness to withstand the electrical stresses.

By combining the concept deemed most promising according to the project, that of designing a magnetic circuit with a winding, known as a "monolith cylinder armature", a concept in which two cylinders of conductors are enclosed in three cylinders of insulation and the whole structure is attached to an iron core without teeth, it was assessed that a rotating electric machine for high-voltage could be directly connected to a power network. The solution entailed the main insulation having to be made sufficiently thick to withstand network-to-network and network-to-ground potentials. Drawbacks with the proposed solution, besides its demand for a super-conducting rotor, are that it also requires extremely thick insulation, which increases the machine size. The coil ends must be insulated and cooled with oil or freons in order to control the large electric fields at the ends. The whole machine must be hermetically enclosed in order to prevent the liquid dielectric medium from absorbing moisture from the atmosphere.

SUMMARY OF THE INVENTION

The object of the present invention is to solve the above mentioned problems and to provide a rotating electric machine which permits direct connection to all types of high-voltage power networks.

This object is achieved by providing a conductor for high-voltage windings, as described herein with the advantageous features also described herein. A feature of the invention is that the electrical insulation between the strands of the conductor is made such that only certain strands are clad with an electrically insulating layer, and these strands which are provided with the insulating layer are so situated within the layers of the conductor that no two uninsulated strands come into electrical contact with each other.

Preferably, the electric conductor according to the invention has a number of twisted layers consisting of strands, of copper, aluminium or other suitable metal. However, contrary to conventional conductors for power transmission, the electrically conducting layer of the conductor is subjected to a magnetic field which induces currents, resulting in losses. In order to reduce these losses, therefore, the strands must be insulated from each other, but the requirement still remains that at least some strand in the outermost layer must be in contact with an inner semiconducting layer in the conductor's insulation. Therefore, the conductor is further characterized in that at least one strand in the outermost strand layer is uninsulated.

The uninsulated strand or strands in the outer layer of the conductor defines the potential on the inner semiconducting layer and thereby the advantage is achieved that it ensures a uniform electric field within the insulation. By using uninsulated strands instead of insulated strands the advantage is also achieved of obtaining a less expensive insulated conductor for a winding.

As yet another advantageous feature the present invention, only a minority of said strands are uninsulated from each other.

As regards the rotating electric machine according to the present invention, it is characterized in that the winding has at least one current-carrying conductor that a first layer having semiconducting properties is provided around said conductor, that a solid insulating layer is provided around said first layer, and that a second layer having semiconducting properties is provided around the insulating layer.

Preferably, a rotating electric machine according to the present invention has a high-voltage insulated conductor/cable with a central electric conductor. Also the machine has a number of strands of copper (Cu), for instance, usually having a circular cross section. These strands are arranged in the middle of the high-voltage cable. Around the strands is a first semiconducting layer, and around the first semiconducting layer is an insulating layer, e.g. crosslinked polyethylene (XLPE) insulation. Around the insulating layer is a second semiconducting layer. Thus, in the present case, the concept of a "high-voltage cable" normally used to denote a winding in a rotating electric machine does not include the outer protective sheath that normally surrounds such cables for power distribution. Furthermore, in a high-voltage cable for power distribution there is also an outer insulating layer on top of the second semiconducting layer, which is not included here.

By using conductors, of substantially the same type as conductors for transferring electric power, in the stator winding of the generator, in accordance with the invention, the advantage is achieved that the voltage of the machine is increased to such a level that it can be connected directly to the power network without intermediate transformers.

A rotating electric machine as described herein makes it is possible to have at least one winding system of conductors suitable for direct connection to distribution or transmission networks.

This also entails the further important advantage that the Δ/Y-connected step-up transformer mentioned above can be omitted. Consequently, the solution according to the present invention represents major savings both in economic terms and regarding space requirement and weight for generator plants and other installations that use rotating electric machines.

To be able to cope with the problems which arise in case of direct connection of rotating electric machines to all types of high-voltage power networks, a machine according to the present invention may have a number of features which significantly distinguishes it from the state of the art both as regards to conventional mechanical engineering and the mechanical engineering which has been published during the last few years, some of which will follow below.

As mentioned, the winding is manufactured from one or more insulated conductors with an inner and an outer semiconducting layer, preferably an extruded cable of some sort. Some typical examples of such conductors are a cable of crosslinked polyethylene (XLPE) or a cable with ethylene propylene (EP) rubber insulation, which, however, for this purpose and according to the invention, has an improved design both as regards the strands of the conductor and as regards the outer layer.

The conductor is provided with an outer semiconducting layer with the aid of which its potential in relation to the surroundings shall be defined. This layer must therefore be connected to ground, at least somewhere in the machine, possibly only in the coil-end section.

The use of an insulated conductor with an outer semiconducting layer has the advantage that it permits the outer layer of the winding, in its full length, to be maintained at ground potential. Consequently, the invention may have the feature that the outer semiconducting layer is connected to ground potential. As an alternative, the outer layer may be cut off, at suitable locations along the length of the conductor, and each cut-off part length may be directly connected to ground potential.

A considerable advantage with having the outer layer connected to ground potential is that the electric field will be near zero in the coil-end region outside the outer semiconductor and that the electric field need not be controlled. This means that no field concentrations can be obtained, neither within the sheet, nor in the coil-end region, nor in the transition therebetween.

As another advantageous feature, at least two, and preferably all three, of the layers have substantially equal thermal expansion coefficients. Through this it is achieved that thermal movement is prevented and the occurrence of cracks, fissures or other defects in the winding due to thermal movement is avoided.

According to another characterizing feature each of the three layers is solidly connected to the adjacent layer along substantially the whole connecting surface. This has the advantage that the layers are fixed and unable to move in relation to each other and serves to ensure that no play occurs between the layers. It is very important that no air is allowed to enter in-between the layers since that would lead to disturbances in the electric field.

As mentioned, the present invention is intended for use at high voltages, which here refers primarily to voltages in excess of 10 kV. A typical operating range for a device according to the invention may be voltages from 36 kV up to 800 kV, preferably in the range 72,5–800 kV. In addition, the invention has the advantage to ensure uniform current distribution, counteract eddy-current losses and ensure that the inner semiconducting layer of the insulation system has the same potential during operation as the wire or strand layers in the conductor.

The material requirements for the insulating layer with regard to the XLPE process, for instance, are that it shall be stable, will not melt and is resistant to deformation at temperatures up to 220° C. for approximately 30 min. Examples are enamelled wire, powder sintering (epoxy, high-temperature plastic), extruded high-temperature plastic, and oxide layers.

The above-mentioned object of the present invention is optimized by the various embodiments of the construction of the conductor as discussed herein.

BRIEF DESCRIPTION OF THE DRAWINGS

The conductor for the stator winding in a high-voltage generator according to the present invention will be illustrated further in the following description of a number of embodiments by way of example, with reference to the accompany drawings in which.

DETAILED DESCRIPTION OF PREFERRED EMBODIMENTS

Figure 1:
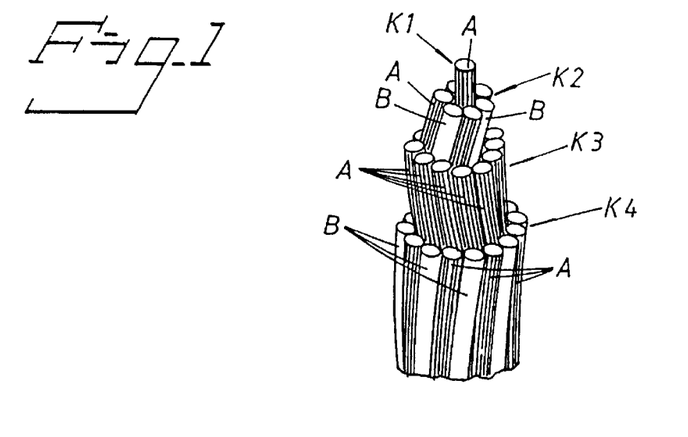
FIG. 1 shows an embodiment of a conductor according to the invention with strands arranged concentrically in layers with different stranding direction.

FIG. 1 shows an example of a conductor according to the invention with circular strands A and B having uniform cross section, which have been arranged concentrically. The strand layers K1, K2, K3 and K4 are arranged with alternating stranding direction. The strands A, shaded in the drawings, are electrically insulated, whereas the strands B (not shaded in the drawings) are electrically uninsulated. Thus alternate strands (B) in alternate strand layers K2, K4 are uninsulated. In the conductor illustrated, strand layers having 1+6+12+18 strands A+B are shown, thus, 9 strands B in the outer layer K4 and 3 strands B in the layer K2 next to the innermost layer are uninsulated, i.e. 12 strands out of 37 are uninsulated.

Figure 2:
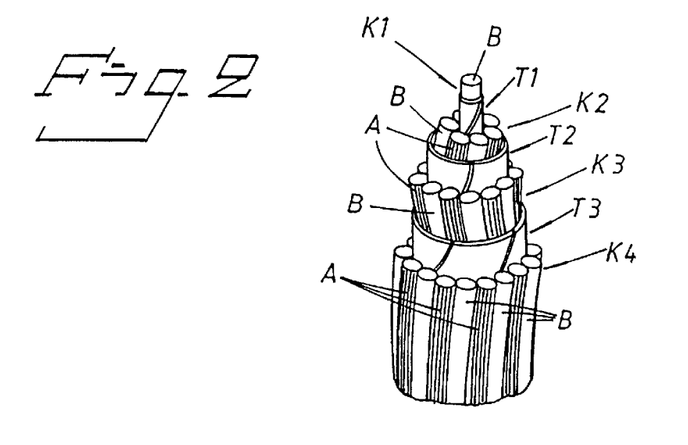
FIG. 2 a second embodiment of the conductor according to the invention with strands arranged concentrically in layers insulated from each other with insulating tape inserted between the layers.

FIG. 2 shows another embodiment of the conductor according to the invention by way of example. As with the conductor according to FIG. 1, circular strands A and B with uniform cross section are arranged concentrically. As in FIG. 1 the strand layers K1, K2, K3 and K4 are arranged in alternating directions. The strands A (shaded in the drawings) are insulated, whereas the strands B (not shaded in the drawings) are uninsulated. Thus alternate strands in all the strand layers are uninsulated. The strand layers K1, K2, K3 and K4 are insulated from each other by way of a tape T1, T2 and T3, respectively, inserted between the strand layers and either having a tape running longitudinally in the conductor or, as shown in FIG. 2, a tape being spun between the layers. Of the 37 total strands A+B, 19 strands B (i.e., B strands) are uninsulated here. The tapes T1, T2, T3 may be of paper or other insulating material.

The tape T1 may of course be omitted if the single strand in strand layer K1 is insulated.

Figure 3:
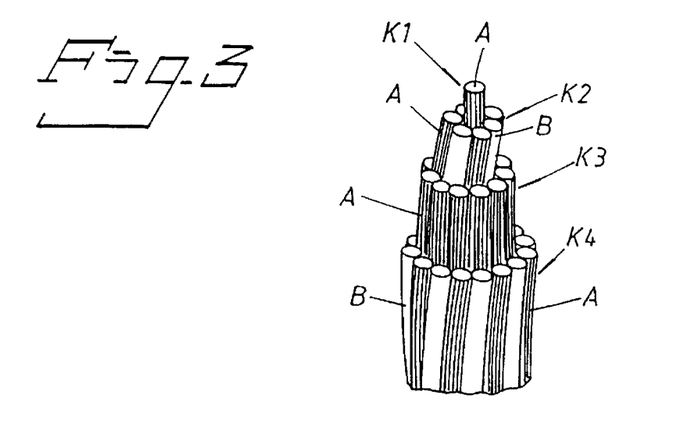
FIG. 3 shows an embodiment of the conductor according to the invention similar to that in FIG. 1, but in which the strands have been arranged in the same direction.

FIG. 3 shows a conductor built up in accordance with that in FIG. 1 with the exception that the strand layers K2, K3 and K4 are stranded in the same direction.

Figure 4:
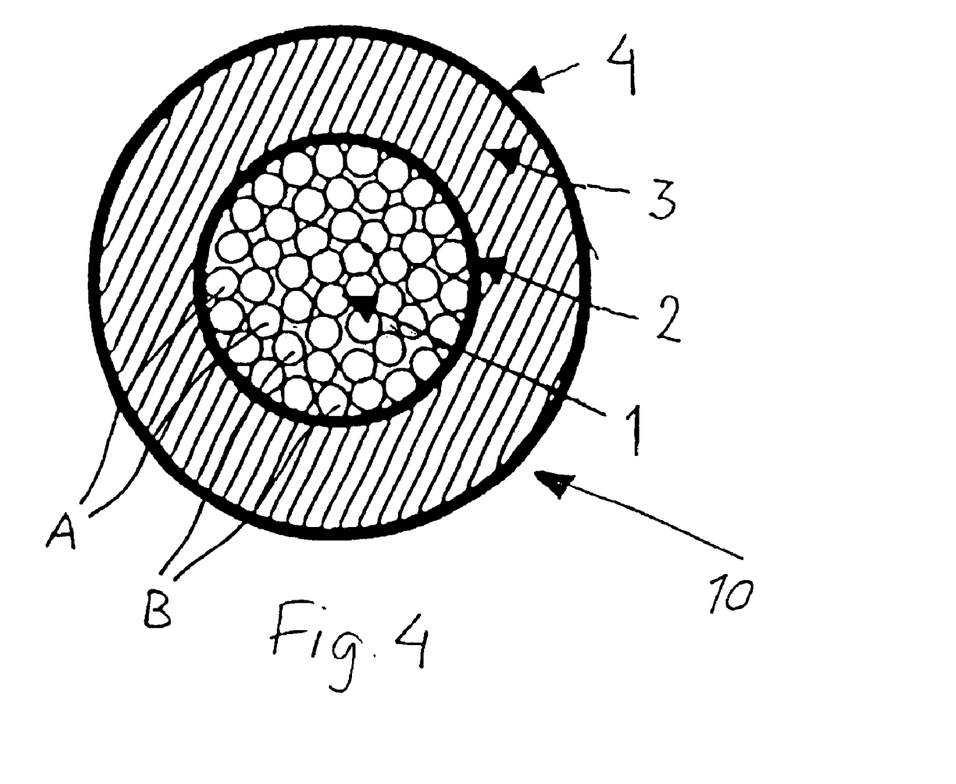
FIG. 4 is a cross section through an insulated conductor or cable including a central conductor according to the invention.

FIG. 4 shows a cross-sectional view of a high-voltage cable including a central conductor 1 according to the present invention. This cable is not identical with what is normally intended by the expression "high-voltage cable", as is explained below. A more relevant expression may be "insulated conductor", but in order to distinguish the insulated conductor from the (central) conductor of the invention, the expression "cable" may be used. It should be stressed that whenever only the expression "conductor" is used in the present document, this does not pertain to the cable or insulated conductor, but to the conductor element in the center of the cable.

In FIG. 4, the high-voltage cable includes the (central) conductor 1 having a number of strands A,B of copper (Cu), for instance, with circular cross section. These strands A,B are arranged in the middle of the high-voltage cable. Around the strands A, B is a first semiconducting layer 2, and around the first semiconducting layer 2 is an insulating layer 3, e.g. XLPE (cross-linked polyethylene) insulation. Around the insulating layer 3 is a second semiconducting layer 4. Thus the concept "high-voltage cable" in the present document does not include the outer protective sheath that normally surrounds such cables for power distribution. As regards to the geometric dimensions of the insulated conductor or cable, the conductor area is in the approximate interval of 80–3000 mm² and the outer diameter is in the approximate interval of 20–250 mm.

The conductor according to the invention may of course be made up of more or fewer strand layers depending on the demands placed on the conductor in the stator winding of the generator. It is also possible to make the strand layers out of pre-shaped strands, in which case the cross section of the conductors can be minimized. In other variations, the conductor according to the invention may have strands with different cross section in the various layers. In order to achieve a uniform cross section between the insulated strands A and the uninsulated strands B, the electrically conducting area of the insulated strands A may be less than the area of the uninsulated strands B.

Although copper is the most efficient material for the strands, A and B in the conductor, other electrically conducting materials such as aluminium are also feasible. The strands in different layers may be of different electrically conducting material.

It is also feasible for the insulated strands A to consist of aluminium, the surface of which is oxidized and thus provides the requisite insulation.

Minimization of the eddy current losses is achieved by ensuring that the strands used in the finished conductor according to the invention do not have a diameter exceeding 4 mm, preferably <2 mm. A condition for the potential on the conducting strand layers being the same as on the inner semiconducting layer of the conductor during operation is that the outer layer of strands K4 has at least one uninsulated strand B, which is thus in electrical contact with the semiconducting layer (not shown in the drawings). Examples are enamelled wire, eddy sintering, extrusion, and oxide layer.

We claim:

1. A conductor for carrying a current in a high-voltage winding in an electric machine, comprising:
   a first strand being clad with an electrically insulating layer; and
   a second strand being uninsulated, wherein
   said first strand and said second strand being arranged in two or more layers of strands,
   said two or more layers of strands being insulated from one another,
   said two or more layers being arranged around a central core, said central core being at least one of
      another strand that is one of an insulated strand and an uninsulated strand, and
      at least one of an air core and another material, and
   said second strand being positioned so as to not electrically contact any uninsulated strands.

2. The conductor of claim 1, wherein:
   at least one strand in an outermost layer of said two or more layers of strands being uninsulated.

3. The conductor of claim 2, wherein:
   at least one strand in an outermost layer of said two or more layers of strands being uninsulated; and
   said two or more layers of strands having circular strands arranged concentrically with alternating stranding direction in respective of the two or more layers of strands.

4. The conductor of claim 3, wherein:
   respective of the first strand and second strand having a pre-shaped cross-section.

5. The conductor of claim 2, wherein:
   said two or more layers of strands having at least three strand layers, said at least three strand layers having alternate layers, wherein
   every other strand in each of said alternate layers being uninsulated; and
   said at least three layers being formed with circular strands and being arranged concentrically with alternating stranding direction.

6. The conductor of claim 2, wherein:

said two or more layers of strands being formed with circular strands arranged concentrically with alternating stranding direction; and every other strand in each of said alternate layers being uninsulated; and respective of the two or more layers of strands, being insulated from one another by an insulating tape.

7. The conductor of claim 6, wherein:

the insulating tape being arranged either longitudinally along the respective two or more layers of strands or spun between the two or more layers of strands.

8. The conductor of claim 6, wherein:

the insulating tape being at least one of paper and a synthetic material.

9. The conductor of claim 1, wherein:

said two or more layers of strands being arranged in a common layer direction.

10. The conductor of claim 1, wherein:

a diameter of at least one of the first strand and the second strand not exceeding 4 mm.

11. The conductor of claim 10, wherein:

said diameter being approximately 2 mm.

12. The conductor of claim 1, wherein:

said first strand being an aluminum wire having an insulating oxide layer thereon; and said second strand being at least one of an uninsulated copper wire and a uninsulated aluminum wire.

13. The conductor of claim 1, wherein:

a minority of said strands in the two or more layers of strands being uninsulated from each other.

14. A rotating electric high-voltage machine comprising:

a stator;

a rotor opposing said stator; and a high-voltage winding in said stator and having a cable, said cable having
  a conductor for carrying a current,
  a first semiconducting layer formed around said conductor,
  a solid insulating layer formed around said first semiconducting layer, and
  a second semiconducting layer formed around said solid insulating layer, wherein
said conductor includes
  a first strand clad with an electrically insulating layer, and
  a second strand being uninsulated.

15. The machine of claim 14, wherein:

a potential of said conductor being substantially equal to that of said first semiconducting layer.

16. The machine of claim 14, wherein:

said second semiconducting layer being configured to provide a substantially equipotential surface surrounding said conductor.

17. The machine of claim 16, wherein:

said second semiconducting layer being connected to a predetermined potential.

18. The machine of claim 17, wherein:

said predetermined potential being a ground potential.

19. The machine of claim 14, wherein:

said solid insulating having a thermal expansion coefficient being substantially equal to that of at least one of the first semiconducting layer and the second semiconducting layer.

20. The machine of claim 14, wherein:

said solid insulating layer being solidly connected along a whole connecting surface to said first semiconducting layer and another connecting surface to said second semiconducting layer.

21. A rotating electric high-voltage machine having a magnetic circuit, comprising:

a magnetic core; and a high-voltage winding having a cable with
  a multi-strand conductor configured to carry an electric current,
  a first semiconducting layer formed around said multi-strand conductor,
  a solid insulating layer formed around said first semiconducting layer, and
  a second semiconducting layer formed around said solid insulating layer, wherein
said multi-strand conductor includes
  a first strand being clad with an electrically insulating layer, and
  a second strand being uninsulated,
said first strand and said second strand being arranged in two or more layers of strands that are insulated from one another,
said two or more layers being arranged around a central core, said central core being at least one of
  another strand that is either an insulated strand or an uninsulated strand, and
  at least one of an air core and another material, and
said second strand being positioned so as to not electrically contact any uninsulated strands.

* * * * *

UNITED STATES PATENT AND TRADEMARK OFFICE
CERTIFICATE OF CORRECTION

PATENT NO. : 6,378,300 B1
DATED : April 30, 2002
INVENTOR(S) : Kevin L. Johnson et al.

It is certified that error appears in the above-identified patent and that said Letters Patent is hereby corrected as shown below:

<u>Title page,</u>
Item [75], the first inventor's name should be -- Kevin L. Johnson --

<u>Column 10,</u>
Line 50, delete "opposite of said lateral surface" and insert after the word "plate" -- opposite of said lateral surface --

Signed and Sealed this

Fifteenth Day of October, 2002

*Attest:*

JAMES E. ROGAN
*Attesting Officer* *Director of the United States Patent and Trademark Office*